(No Model.)
C. F. LAWTON.
METHOD OF BREWING.
No. 468,808. Patented Feb. 16, 1892.
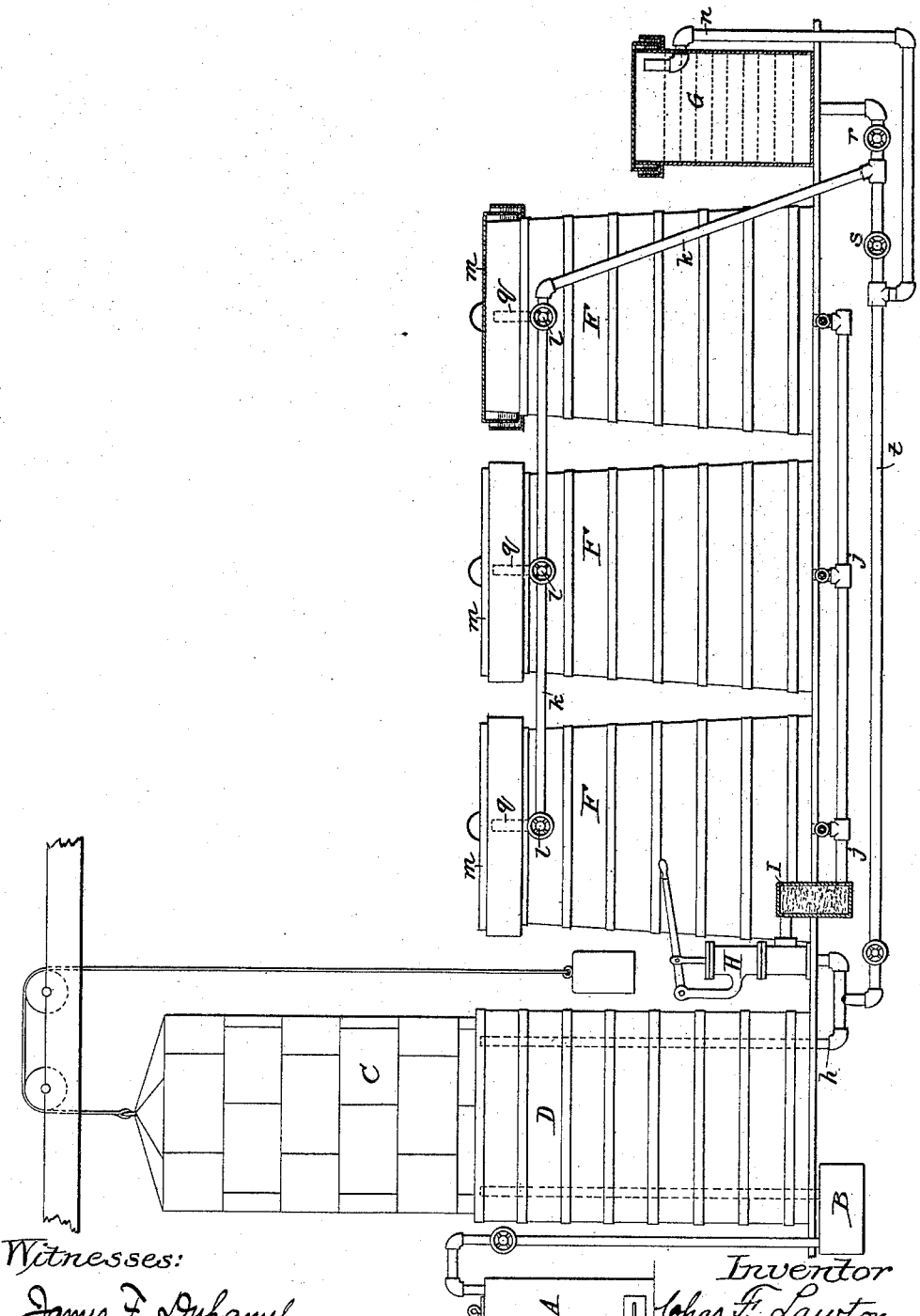
Witnesses:
James F. Duhamel
Horace H. Dodge
Inventor
Chas. F. Lawton,
by Dodge & Sons,
Attys.

UNITED STATES PATENT OFFICE.

CHARLES FRANCIS LAWTON, OF ROCHESTER, NEW YORK, ASSIGNOR TO ROBERT H. SALMONS, OF SAME PLACE.

METHOD OF BREWING.

SPECIFICATION forming part of Letters Patent No. 468,808, dated February 16, 1892.

Application filed August 4, 1890. Serial No. 360,985. (No model.)

*To all whom it may concern:*

Be it known that I, CHARLES FRANCIS LAWTON, a citizen of the United States, residing at Rochester, in the county of Monroe and State of New York, have invented certain new and useful Improvements in the Method of Brewing, of which the following is a specification.

My invention has for its object a quick or vigorously rapid method of fermenting the liquor, at the same time avoiding or preventing those changes which render the beer what is technically called "sick."

While the proper yeast of beer and ale multiplies more rapidly in contact with a rightly-proportioned supply of common air or free oxogen, the germs of some diseases common to fermented liquors are retarded in their life and vigor by the presence of oxygen gas. The oxygenation of the fermenting liquor is accomplished by the "bottom-fermentation" process of Bavaria; but the process is too slow by reason of the low temperature that is required to prevent souring, the yeast being all on the bottom and the fermenting beer being freely exposed to the air, unobstructed by floating barm, and the fermenting-tuns being wide and shallow, thus exposing a great surface to the atmospheric oxygen. The beer made by this Bavarian or bottom-fermentation process has the quality of keeping good for a much longer time after it has been sent from the brewery than any beer brewed by the common or more usual process. The reason for this is that the atmospheric oxygen absorbed by the fermenting liquor removes and renders insoluble the yeast and other nitrogenous or albumenoid substances dissolved in the liquor. The presence of these substances in the finished beer is what causes it to quickly spoil on keeping. The drawbacks to the bottom-fermentation process are the extraordinary care and skill that must be used in its manipulation, the long time required to finish each brewing, the low temperature required to prevent souring, and the large size of plant required to accommodate a business having but a moderate annual output of finished beer.

By my process I propose to make beer equal in quality to that made by the bottom-fermentation process and at the same time brew it quickly and avoid souring. Though the presence of air or oxygen encourages the growth of acetic acid as well as the proper or yeast ferment in beer, this same air at the same time kills that most injurious of all sick ferments in beer, the butyric, as my experiments and the experience of others have conclusively proved. In my process I avoid both acetic and butyric ferments and at the same time hasten the proper or yeast ferment.

My process consists in treating the fermenting liquors with atmospheric air, in combination with other conditions which I believe are necessary to make the air treatment practical. The air that I use I first let stand in a close sheet-iron gas-holder inverted over water until all the dust containing disease-germs has settled and become entrapped in the water below. In the tank of water over which the air is confined I dissolve ferrous sulphate, copper sulphate, or zinc chloride for the purpose of preventing the water from becoming foul or stagnant. After standing over this water long enough to become purified the air is forced into pipes lying in the bottom of the fermenting-tuns. These pipes are pierced with fine holes, and through these holes the injected air rises in fine streams or bubbles into the fermenting liquor. The liquor is maintained at a higher temperature than is usual in brewing for the purpose of hastening the process, the injection of purified air into the liquor making it possible to brew rapidly at a high temperature without sickening. Should the acetic ferment show itself, the liquor is suddenly deprived of all free oxygen by forcing up through it fine streams or bubbles of a mixture of forty-two parts, by balance, of carbon-monoxide gas with seventy-nine parts of nitrogen. This treatment, as many experiments of mine have proved, kills the acetic ferment most effectually without killing the proper or yeast ferment, although it stops the action of the yeast until the liquor has been again aerated. The same pipes are used for injecting the carbon-monoxide mixture as are used for injecting the air into the fermenting liquor. Though the quantity of free oxygen dissolved in the liquor is at all times extremely small, yet the entire privation of this small quantity more effectually extinguishes the acetic than it does the proper or yeast ferment. The passing of the carbon-monoxide through the fermenting liquor in many fine streams or bubbles washes or rinses out, so to speak, the uncombined oxygen in the liquor, which supports the acetic as well as the proper ferment, and, as before stated, after this acetic ferment is killed the liquor may be again aerated and the proper fermentation proceeded with. Well-purified air is always used for aerating the liquor. Toward the close of the brewing less air is injected into the liquor. Too much air at this stage carries off the carbonic acid required to give the beer a proper taste.

In the drawing herewith affixed, A is a retort for generating a mixture of carbon-monoxide and nitrogen gases by the imperfect combustion of clean hard coal, coke, or charcoal. The carbonaceous fuel in this retort is quickly brought to a red heat throughout its whole mass by giving the fire in the bottom of the retort an abundant supply of air. This preliminary heating burns out or expels from the fuel all those impurities which would give a bad odor to the gas and thus a bad taste to the beer treated with it. After the fuel has been thus properly purified the quantity of air blown into the retort is greatly diminished, which results in the production of almost absolutely pure carbon monoxide mixed with tasteless and odorless nitrogen derived from the air blown into the bottom of the retort. When carbon monoxide instead of carbon dioxide is produced in the retort, the escaping gas has a much lower temperature.

B is a close iron box in which the heavier particles carried by the gas from the retort A have a chance to settle. From the box B the gas ascends by a perpendicular pipe (represented by dotted lines) into the holder C, which is by turns used for holding gas and air and is suspended in the tank of water D. After the gas has remained in C long enough for all of its finer dust to settle into the water below it is ready for forcing, by means of a pump H, into any one or all of the brewing-tanks F F F. The gas enters these tanks by pipes in the bottom, a portion of which pipes is shown at $j\ j\ j$. These pipes $j$ communicate with the horizontal perforated pipes lying in the bottom of the tanks. The top of each brewing-tun is closed gas-tight by means of covers $m\ m\ m$, which covers have a down-projecting rim, which dips into a narrow annular trough of water surrounding the top of each tank. The gas after coming up in fine streams of bubbles through the liquor enters the top of the short perpendicular pipe inside the tank (represented by dotted lines at $q$) and escapes by the valve $l$ into the outside pipe $k$, by which it is conveyed to the closed receptacle G, where it passes up through trays or sieves containing moist ferrous oxide mixed with lime. This ferrous oxide deprives the gas of the small quantity of free oxygen which the gas has rinsed out of the beer and thus allows of the gas being used over again almost indefinitely. From the deoxidizing-chamber G the gas passes by a pipe (partly represented at $n$) back to the force-pump H to be again driven through the liquor in the brewing-tanks.

By means of pipes and valves any one of the brewing-tuns may be treated with gas or air independently of the other tuns. When the air treatment is to begin, the tank or sheet-iron holder C is filled with common air instead of the other gas mixture and allowed to stand until all of its dust-particles have settled into the water below and then it will be ready for use. The air after passing through the beer is not allowed to enter the deoxidizing-chamber G, but is cut off from entering this receptacle by closing the valve $r$. The valve S is then opened and the air returns to the pump by the pipe $t$, and from the pump it may be again forced through the fermenting beer, and so on repeated until the liquor has taken so much oxygen out of the air and the air so largely mixed with carbonic-acid gas from the fermenting beer that a fresh supply is needed.

At $h$ is a pipe that conveys the gas or air in C to the gas and air pump.

Between the air and gas holder C and the pump H is a filter I, consisting merely of a cylindrical vessel filled with cotton closely packed, and through this filter the air is forced on its way to the air and gas holder. The cotton will not take out all of the ferment-germs from the air forced into the holder; but it arrests a large part of the floating matter of the air, while the confining of the air in the air-holder in a quiet state over water charged with antiseptics removes the remainder of the floating ferment-germs.

By passing the carbon monoxide and nitrogen mixture through the mixture of ferrous oxide and lime the oxygen rinsed out of the wort or beer by the passage of the two gases (nitrogen and carbon monoxide) is taken out of the passing gases and fixed by combination with the hydrated ferrous oxide produced by treating ferrous sulphate with lime. This operation enables the brewer to use the nitrogen and monoxide mixture over several times until the gas becomes so mixed with carbon dioxide from the fermenting wort as to too largely dilute it for further use. Of course if there is an excess of lime in the deoxidizing-mixture the carbon dioxide can also be absorbed from the gaseous mixture; but as the quantity of lime required for this would be considerable and the nitrogen and monoxide mixture can be produced very cheaply it would hardly pay to try and extend the use of the same lot of gas indefinitely.

Having thus described my invention, what I claim is—

1. The improvement in the process of manufacturing beer, which consists in alternately passing through the fermenting liquid common air and a mixture of carbon-monoxide and nitrogen gases.

2. The improvement in the process of manufacturing beer, which consists in alternately passing through the fermenting liquid common air and a mixture of carbon-monoxide and nitrogen gases and then passing the carbon-monoxide and nitrogen mixture through a mixture of ferrous oxide and lime for the purpose of enabling the gas to be used over again, for the purpose described.

In witness whereof I hereunto set my hand in the presence of two witnesses.

CHARLES FRANCIS LAWTON.

Witnesses:
SELDEN S. BROWN,
ANNA L. FOOTE.